May 8, 1923.
C. M. DAVIS
COASTER BRAKE
Filed July 14, 1921
1,454,707
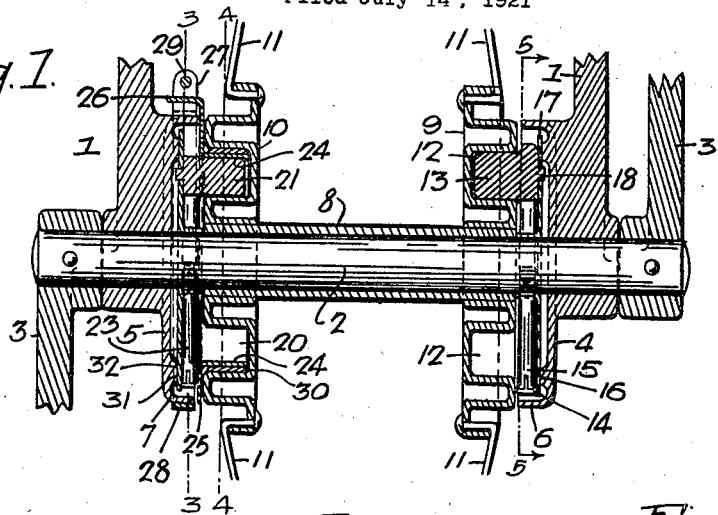
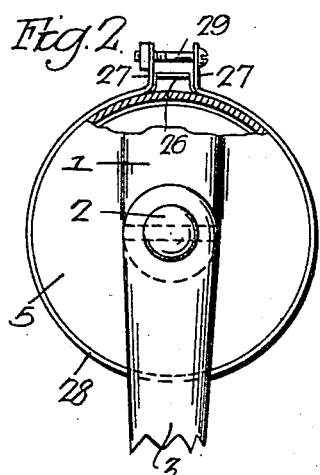
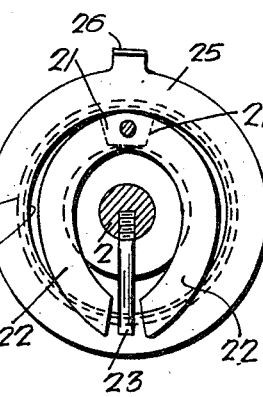
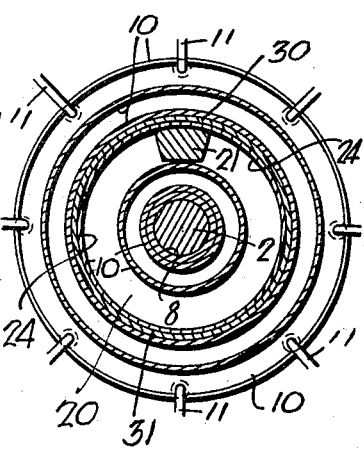
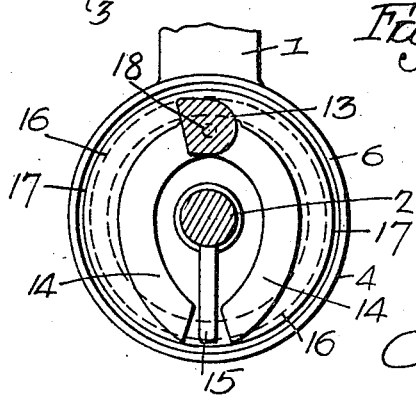
Inventor—
Clarence M. Davis.
by his Attorneys
Howson & Howson Patented May 8, 1923.

1,454,707

UNITED STATES PATENT OFFICE.

CLARENCE M. DAVIS, OF CAPE MAY, NEW JERSEY, ASSIGNOR, BY MESNE ASSIGNMENTS, TO A. MECKY COMPANY, A CORPORATION OF PENNSYLVANIA.

COASTER BRAKE.

Application filed July 14, 1921. Serial No. 484,656.

*To all whom it may concern:*

Be it known that I, CLARENCE M. DAVIS, a citizen of the United States, residing in Cape May city, New Jersey, have invented Coaster Brakes, of which the following is a specification.

One object of this invention is to provide a relatively simple, inexpensive and efficient form of a coaster brake particularly designed for use on toy vehicles such as bicycles, tricycles and velocipedes, whereby it shall be possible for the rider of the vehicle to propel a member such as a wheel in a forward direction, allow the vehicle to coast, apply a braking force or positively drive such member backward or in a reversed direction.

These objects and other advantageous ends I attain as hereinafter set forth, reference being had to the accompanying drawings, in which, Fig. 1 is a longitudinal vertical section, showing my invention as applied to a driving wheel; Fig. 2 is an end elevation, partly in section, further illustrating the construction shown in Fig. 1; and Figs. 3, 4 and 5 are respectively vertical sections on the lines 3—3, 4—4 and 5—5, Fig. 1.

In the above drawings, 1—1 represent the lower ends of the branches of a bicycle or velocipede fork, in which is journalled a crank spindle 2 having pinned to its ends a pair of pedal cranks 3—3 outside of the forked branches. The adjacent faces of the latter are formed with what in the present instance are integral, substantially parallel circular plates 4 and 5 having their edges flanged toward each other as indicated respectively at 6 and 7.

Mounted on the crank spindle 2 between the branches of the fork 1—1 is a sleeve 8 having fixed to its ends by welding, brazing, or otherwise, two parallel plates 9 and 10 for the reception of the two sets of spokes 11—11 of the wheel, whose rim and tire have been omitted from the drawing. The spoke plate 9 is formed with an annular recess 12 concentric with the spindle 2 and opening outwardly so as to be enclosed or covered by the plate portion 4 of the adjacent fork branch 1. Operative within this recess 12 is a clutch cam 13 having integral with or otherwise rigidly fixed to it a pair of arms, together forming a horse shoe shaped structure 14, whose ends are spaced apart to permit of the extension between them of a pin 15 extending radially outward from the crank shaft 8. The frictional engaging side of the clutch cam 13 is preferably substantially rectangular in cross-section while the opposite side is rounded, as shown in Fig. 5, to provide for the free backward movement of the cam 13 when the brake mechanism, hereinafter described, is rendered effective. On the inner face of the fork-carried plate 4 is an annular rib 16 designed to frictionally act on a flat, circular frictional drag plate 17 held by a pin 18 to the clutch cam 13. The drag plate 17 thus provides a pivotal support for the lever mechanism comprising the arms 14 and the cam 13.

With the above described arrangement of parts, if the crank shaft or spindle 2 be turned in the direction necessary to forwardly drive the wheel, the radial pin 15 will act upon one of the ends of the horse shoe shaped piece 14, which being frictionally engaged by the frictional drag plate 17, causes the clutching cam to be tilted in the annular recess 12, so that it engages or grips the inner and outer walls of said recess, thus clutching the crank shaft to the spoke plate 9 and driving the wheel. If now the propelling force on the crank arms 3 be lessened so that the pin 15 no longer presses against the member 14, the clutch cam 13 releases the member 9 which is thereupon permitted to continue turning independently of the crank shaft and its associated parts.

In order to retard the revolution of the wheel or rotate it backwardly, I form the spoke plate 10 with an annular recess 20, having a side opening closed by the fork-carried plate 5. In this recess is a cam 21 forming part of or rigidly attached to a horse shoe shaped member 22 between whose separated ends projects a second radial pin 23 fixed to the shaft 2. Mounted between the cam 21 and the outer wall of the recess 20 is a sleeve 24 formed with an outwardly projecting flange 25 carrying a tongue 26 bent at right angles to said flange so as to fit between the two substantially parallel arms 27 of a ring 28 clamped on the outer surface of the flange 7 of the fork plate 5 by means of a bolt 29 extending between said arms 27. An annular liner 30 is placed between the sleeve 24 and the outer wall of the recess 20 of the plate 10.

With this arrangement of parts, the forward turning of the crank shaft has no effect since, as above noted, the pin 15 causes operation of the clutch formed by the cam 13 and the plate 9. On the other hand, if the crank shaft 2 be turned backwardly the pin 23 at once acts on one of the arms of the member 22 to tilt its cam 21, whose rotation is more or less retarded by the friction ring 24; it being noted that this action does not occur when the crank is turned forwardly since the pin 15 causes gripping of the cam 13 and plate 9 before the pin 23 can be moved far enough to cause operation of the cam 21. As a result said cam on the one hand grips the inner surface of the recess 20 and acts through the friction ring 24 on the liner 30, applying a greater or less braking force to the plate 10 and hence on the wheel of which it forms a part. As can readily be seen, the cam 13 at this point cannot be rendered effective by reason of the curved surface thereof. This braking force may be increased or continued until the rotation of the wheel is stopped, after which said wheel may be driven backward by a backward rotation of the crank shaft 2. Obviously the braking force applied to the wheel will depend upon the force applied to the shaft 2 from the crank arms 3 and when this force is sufficiently diminished or altogether ceases, the cam 21 returns to its normal position in which the crank shaft 2 is free of the plate 10.

If desired, in addition to the above, I may provide a friction plate 31 similar to the friction plate 17 and pinned to the braking cam 21 so as to bear frictionally on an annular rib 32 formed on the inner face of the fork-carried plate 5. Both this plate 31 and the plate 17 are preferably formed with flanges for the reception of the crank shaft 2, and these flanges are slotted to permit of the passage through them of the pins 15 and 23 respectively.

As will be understood by those skilled in the art, the proportions and detail arrangement of the various parts may be considerably altered without departing from my invention, since obviously the combination and design of said parts will be dependent not only on the material employed, but also the work for which the device is designed. From the above description it will be appreciated that the parts of the device may be easily and inexpensively made.

I claim:

1. The combination in a coaster brake of a wheel having two spoke plates; a crank shaft; clutching means coacting with one of the plates and with the shaft; and braking means coacting with the shaft and with the second plate.

2. The combination in a coaster brake of a wheel having two plates; a crank shaft; a clutch operative to connect one of the plates to the shaft when the latter is turned in one direction; and a second clutch for connecting the second plate to the shaft when it is turned in the opposite direction.

3. The combination in a coaster brake of a wheel having two plates; a crank shaft; a clutch operative to connect one of the plates to the shaft when the latter is turned in one direction; and braking means operative on the second plate when the shaft is turned in the opposite direction.

4. The combination in a coaster brake of a wheel having a hub structure formed with two annular recesses; cams respectively operative in the recesses; a crank shaft operatively connected to both of said cams; means for causing one of the cams to grip the hub when the shaft is turned in one direction; and other means for causing the second cam to exert a braking force on the hub when the shaft is turned in the opposite direction.

5. The combination in a wheel of a hub structure having two annular recesses; a crank shaft passing through the hub; cams operative in the recesses and operatively connected to the crank shaft; means for causing one cam to grip the hub structure when the crank shaft is turned in one direction; other means for causing the second cam to grip the hub structure when the shaft is turned in the opposite direction; with friction means tending to retard rotation of the cams.

6. The combination in a wheel of a hub structure having two annular recesses; a crank shaft; cams respectively mounted in said recesses and each having arms; with members connected to the shaft and operative on the cam arms for causing one cam to operate when the shaft is turned in one direction and the other cam to operate when the shaft is turned in the opposite direction.

7. The combination in a wheel of a hub structure having two annular recesses; a crank shaft; cams respectively mounted in said recesses and each having arms; members connected to the shaft and operative on the cam arms for causing one to operate when the shaft is turned in one direction and the other to operate when the shaft is turned in the opposite direction; with friction means for insuring actuation of at least one of the cams.

8. The combination in a wheel of a hub structure having an annular recess; a relatively fixed friction ring in said recess; a crank shaft; a cam operative in the recess and acted on by said friction ring; with means for causing the cam to act between said ring and one of the walls of the recess when the shaft is turned in one direction.

9. The combination in a wheel of a hub structure having a annular recess; a relatively fixed braking ring in said recess; a crank shaft; a cam operative in the recess and acted on by said friction ring; with means for causing the cam to act between said ring and one of the walls of the recess when the shaft is turned in one direction, the same consisting of a pin carried by the shaft and an arm connected to the cam and acted on by the pin.

10. The combination with the fork of a toy vehicle of a crank shaft journalled in the arms of said fork; a wheel having a hub structure operative on the shaft and provided with two annular recesses; cams for said recesses; arms for said cams; means for causing one of the cams to grip the hub when the crank shaft is turned in one direction; and other means causing the second cam to grip the hub structure when the shaft is turned in the opposite direction.

11. The combination with the fork of a toy vehicle of a crank shaft journalled in the arms of said fork; a wheel having a hub structure operative on the shaft and provided with two annular recesses; cams for said recesses; arms for said cams; means for causing one of the cams to grip the hub when the crank shaft is turned in one direction; other means for causing the second cam to grip the hub structure when the shaft is turned in the opposite direction; with friction means operative between one of the branches of the fork and the cam adjacent thereto for retarding rotation of said cam.

12. The combination with the fork of a toy vehicle; of a crank shaft journalled in the arms of said fork; a wheel having a hub structure operative on the shaft and having two annular recesses; cams for said recesses; arms for said cams; and means for causing one of the cams to grip the hub when the crank shaft is turned in one direction; other means causing the second cam to grip the hub structure when the shaft is turned in the opposite direction; and friction members respectively operative between the cams and the adjacent branches of the fork for retarding rotation of said cams.

13. The combination in a coaster brake of a fork having cup-shaped structures at the ends of its branches; a crank shaft journalled in said branches; a wheel having a hub structure mounted on the crank shaft and formed with annular recesses; a clutch cam in one of the recesses; a braking cam in the other recess; means for causing operation of one of the clutch cams when the shaft is turned in one direction; other means for causing operation of the second cam when the shaft is turned in the opposite direction; and friction means in at least one of the cup shaped structures of the fork for retarding rotation of the cam adjacent thereto.

14. The combination in a coaster brake of a hub structure having an annular recess therein; a crank shaft passing through said hub structure; a liner mounted in the recess; a cam also in said recess operative between a wall thereof and said liner; at least one operating arm for the cam; and a projection from the shaft operative on the arm to actuate the cam.

15. The combination in a coaster brake of a hub structure having an annular recess therein; a crank shaft passing through said hub structure; a liner mounted in the recess; a cam also in said recess operative between a wall thereof and said liner; at least one operating arm for the cam; a projection from the shaft operative on the arm to actuate the cam; with friction means for retarding rotation of the cam in said recess.

16. The combination in a coaster brake of a hub structure having an annular recess therein; a crank shaft passing through said hub structure; a liner mounted in the recess; a cam also in said recess operative between a wall thereof and said liner; at least one operating arm for the cam; a projection from the shaft operative on the arm to actuate the cam; friction means for retarding rotation of the cam in said recess, consisting of a ring interposed between the liner and the cam; a flange for said ring; and a projection from said flange for retarding rotation of the ring.

CLARENCE M. DAVIS.